United States Patent
Hardage, Jr. et al.

(10) Patent No.: US 11,422,821 B1
(45) Date of Patent: Aug. 23, 2022

(54) AGE TRACKING FOR INDEPENDENT PIPELINES

(71) Applicant: Apple Inc., Cupertino, CA (US)

(72) Inventors: James N. Hardage, Jr., Austin, TX (US); Christopher M. Tsay, Austin, TX (US); Mahesh K. Reddy, Austin, TX (US)

(73) Assignee: Apple Inc., Cupertino, CA (US)

( * ) Notice: Subject to any disclaimer, the term of this patent is extended or adjusted under 35 U.S.C. 154(b) by 76 days.

(21) Appl. No.: 16/120,675

(22) Filed: Sep. 4, 2018

(51) Int. Cl.
*G06F 9/38* (2018.01)
*G06F 9/30* (2018.01)

(52) U.S. Cl.
CPC ........ *G06F 9/3855* (2013.01); *G06F 9/30036* (2013.01); *G06F 9/3851* (2013.01); *G06F 9/3861* (2013.01)

(58) Field of Classification Search
CPC .. G06F 9/3855; G06F 9/30036; G06F 9/3836; G06F 9/3851; G06F 9/3861
See application file for complete search history.

(56) References Cited

U.S. PATENT DOCUMENTS

| | | |
|---|---|---|
| 5,822,559 A | 10/1998 | Narayan et al. |
| 5,870,578 A | 2/1999 | Mahalingaiah et al. |
| 5,872,947 A | 2/1999 | Narayan |
| 6,256,720 B1 | 7/2001 | Nguyen et al. |
| 6,968,444 B1 * | 11/2005 | Kroesche ............... G06F 9/3822 712/208 |
| 7,269,712 B2 | 9/2007 | Cho |
| 7,984,271 B2 | 7/2011 | Sakamoto et al. |
| 9,058,180 B2 | 6/2015 | Golla et al. |
| 9,336,003 B2 | 5/2016 | Mylius et al. |
| 9,632,790 B2 | 4/2017 | Iyer et al. |
| 9,740,495 B2 * | 8/2017 | Guo ....................... G06F 9/3836 |
| 10,089,114 B2 * | 10/2018 | Kulkarni ............... G06F 9/3851 |
| 2008/0133889 A1 | 6/2008 | Glew |
| 2010/0262807 A1 * | 10/2010 | Burky ................... G06F 9/3861 712/205 |
| 2012/0144173 A1 | 6/2012 | Butler et al. |
| 2012/0144393 A1 | 6/2012 | Vinh et al. |
| 2012/0260069 A1 | 10/2012 | Bishop et al. |
| 2014/0215188 A1 | 7/2014 | Mylius et al. |

(Continued)

*Primary Examiner* — Jyoti Mehta
*Assistant Examiner* — Kasim Alli
(74) *Attorney, Agent, or Firm* — Kowert Hood Munyon Rankin and Goetzel PC; Rory D. Rankin (57) ABSTRACT

A system and method for efficiently handling instruction execution ordering. In various embodiments, a processor includes multiple execution lanes, each executing instructions of a particular type, which are not executed by one or more of the other execution lanes. The instruction queue includes one queue for each particular execution lane. Control logic identifies a current youngest age used in allocated entries of the multiple queues, and determines a starting age based on the identified current youngest age and the number of instructions to be issued. Beginning with the determined starting age, ages (in program order) are assigned to a group of instructions being allocated in the multiple queues. Ages of entries in the multiple queues are updated for instructions not being issued based on the number of instructions being issued. Instructions being issued have age differences between them below a threshold.

20 Claims, 7 Drawing Sheets

(56) References Cited

U.S. PATENT DOCUMENTS

| | | | |
|---|---|---|---|
| 2015/0106595 A1* | 4/2015 | Khot | G06F 9/3851 |
| | | | 712/215 |
| 2016/0259648 A1 | 9/2016 | Di et al. | |
| 2016/0328237 A1 | 11/2016 | Di et al. | |
| 2017/0286120 A1 | 10/2017 | Kulkarni et al. | |
| 2017/0293489 A1 | 10/2017 | Ayub et al. | |

* cited by examiner

AGE TRACKING FOR INDEPENDENT PIPELINES

BACKGROUND

Technical Field

Embodiments described herein relate to the field of computing systems and, more particularly, to efficiently handling instruction execution ordering.

Description of the Related Art

The parallelization of tasks is used to increase the throughput of computer systems. To this end, compilers extract parallelized tasks from program code to execute in parallel on the system hardware. To increase parallel execution on the hardware, some processors use multiple parallel execution lanes. Each of these execution lanes uses multiple pipeline stages. In some examples, one or more of these execution lanes processes types of instructions, which are not processed in one or more other execution lanes. This type of micro-architecture provides higher instruction throughput for particular software applications than a single-lane micro-architecture.

The selection logic residing in the instruction issue queue determines when instructions are issued to execution lanes, to which execution lanes the instructions are issued, and how many instructions are issued simultaneously. The number of logic levels in this selection logic is set by multiple factors such as instruction latencies, the number pipeline stages in the execution lanes, the number of instructions supported for simultaneous issue, and instruction dependencies.

With multiple pipeline stages in each execution lane, it is advantageous to predict early in a given execution lane the outcome of events in later pipeline stages of the given execution lane. Branch instructions and load instructions are two types of instructions that use prediction during execution. A known latency is used for providing a predicted result for these instructions. Younger instructions, including dependent instructions, issue prior to when the actual result is known based on the shorter latency used for providing the predicted result. When the prediction is incorrect, all younger instructions or only younger instructions dependent on the mispredicted instruction are removed from the pipeline and possibly executed again at a later time.

With instructions being issued to different execution lanes, when an instruction mispredicts or causes an exception in a given execution lane, identifying younger instructions in execution lanes other than the given execution lane is not straight-forward. In addition, adding an appreciable number of logic levels in the selection logic of the instruction issue queue to support this identifying of particular younger instructions increases the length of the clock cycle.

In view of the above, efficient methods and mechanisms for efficiently handling instruction execution ordering are desired.

SUMMARY

Systems and methods for efficiently handling instruction execution ordering are contemplated. In various embodiments, a processor includes multiple execution lanes. In some embodiments, each execution lane executes instructions of a particular type, which are not executed by one or more of the other execution lanes. In an example, one execution lane executes integer instructions and memory access instructions, whereas another execution lane executes single instruction multiple data (SIMD) instructions, floating point instructions and/or multimedia instructions. In some embodiments, one or more of the multiple execution lanes perform predictions when executing particular instructions such as memory access instructions and control flow instructions (e.g., branch instructions).

In various embodiments, the processor also includes an instruction queue for storing outstanding fetched and decoded instructions waiting to be assigned to one of the multiple execution lanes. In some embodiments, the instruction issue queue includes one queue for each particular execution lane. Control logic in the instruction issue queue identifies a current youngest age used in allocated entries of the multiple queues. In an embodiment, ages are maintained as a count value with the oldest instruction having an age of zero, the next oldest instruction having a count of one, and so forth. Therefore, the youngest age currently used in allocated entries has the largest count. A starting age is determined based on the identified current youngest age and the number of instructions to be issued. For example, if the youngest age is 3 and the number of instructions to be issued is 2, then the starting age is $(3-2)+1$, or 2. The control logic assigns in program order ages to a group of instructions being allocated in the multiple queues beginning with the determined starting age. The control logic also updates ages of entries in the multiple queues for instructions not being issued. The updates are based on the number of instructions being issued such as 2 in the above example.

To determine which instructions are being issued, the control logic identifies a first group of instructions stored in the multiple queues based at least upon source operand readiness. Each instruction in the first group is to be executed by a respective one of the plurality of execution lanes. Control logic selects a second group of instructions from the first group based on determining which instructions in the first group have age differences between the instructions in the first group below a threshold. In various embodiments, one or more of the multiple execution lanes are used to execute an instruction that is capable of flushing a pipeline in the execution lane. When the control logic determines one or more of the instructions in the second group are assigned to an execution lane capable of flushing its pipeline, the control logic generates a vector. The vector specifies which ones of the multiple execution lanes have assigned instructions of the second group older than instructions of the second group assigned to execution lanes capable of flushing their pipelines.

Each of the second group of instructions and the generated vector are issued to the multiple execution lanes. When a misprediction occurs in a given execution lane, control logic in the execution core accesses the vector issued with the mispredicted instruction. By accessing the vector, control logic determines, for each execution lane other than the given execution lane, whether a given instruction at a same pipeline stage as the mispredicted instruction is older than the mispredicted instruction. If the given instruction is older than the mispredicted instruction, then execution of the given instruction continues. If the given instruction is younger than the mispredicted instruction, then the given instruction is removed from the given execution lane. In various embodiments, each instruction in earlier pipeline stages than the pipeline stage of the mispredicted instruction are removed from the execution lanes. In an embodiment, the removed instructions are placed in a re-issue queue in the instruction queue.

These and other embodiments will be further appreciated upon reference to the following description and drawings.

BRIEF DESCRIPTION OF THE DRAWINGS

The above and further advantages of the methods and mechanisms may be better understood by referring to the following description in conjunction with the accompanying drawings, in which.

While the embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112(f) for that unit/circuit/component.

DETAILED DESCRIPTION OF EMBODIMENTS

In the following description, numerous specific details are set forth to provide a thorough understanding of the embodiments described in this disclosure. However, one having ordinary skill in the art should recognize that the embodiments might be practiced without these specific details. In some instances, well-known circuits, structures, and techniques have not been shown in detail for ease of illustration and to avoid obscuring the description of the embodiments.

Figure 1:
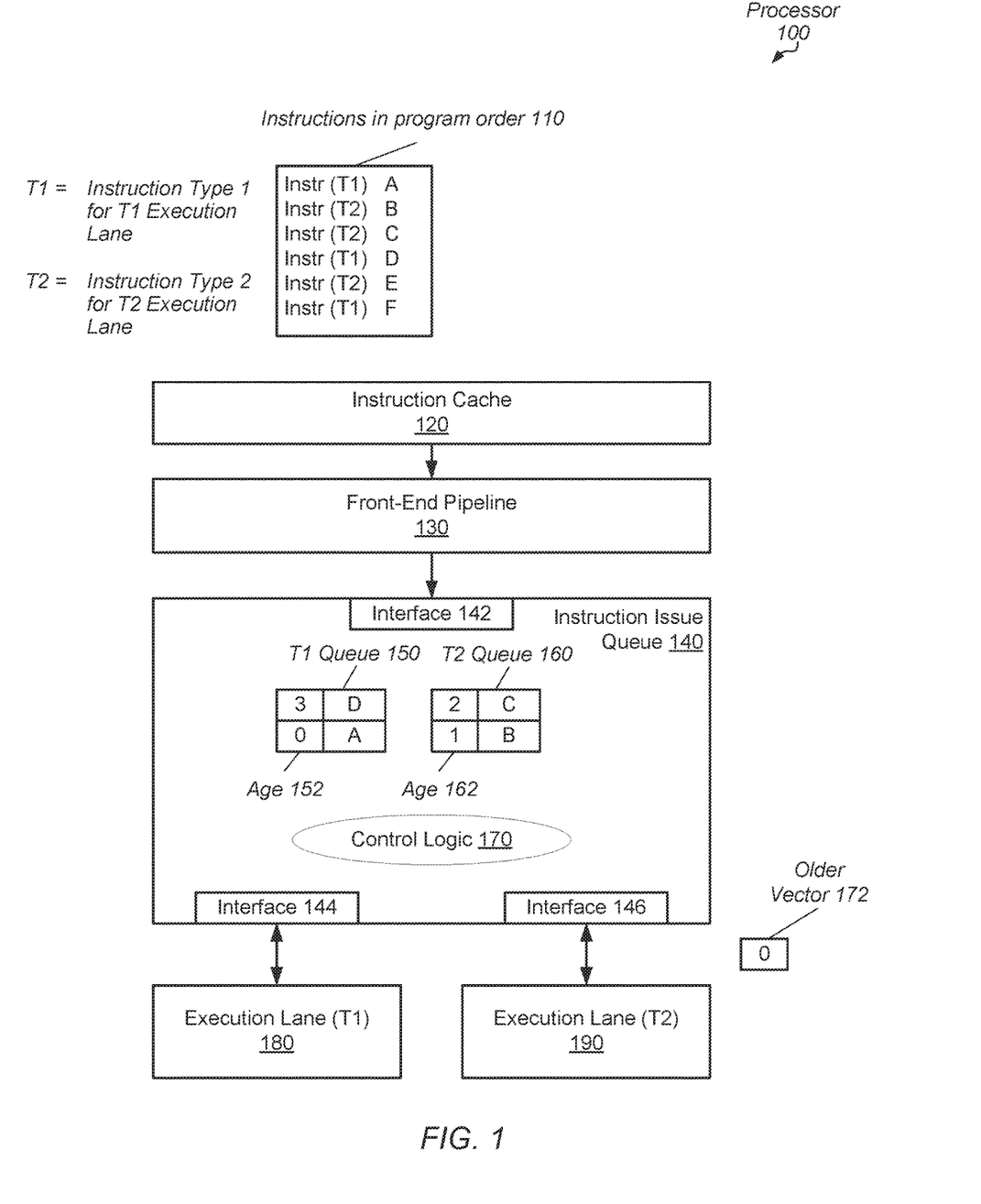
FIG. 1 is a block diagram of one embodiment of a processor.

Referring to FIG. 1, a generalized block diagram of one embodiment of a processor 100 is shown. FIG. 1 generally depicts instructions 110, which are processed by the components 120-190 of processor 100. The instructions 110 are meant to be language agnostic. In this example, general labels, such as "A" to "F", are used to indicate separate in-order instructions. Opcodes, destination operands and source operands, such as architectural registers and any displacement values, are not shown for ease of illustration. As shown, processor 100 includes an instruction cache 120, a front-end pipeline 130, an instruction issue queue 140 and two execution lanes 180 and 190.

In the illustrated embodiment, processor 100 includes two execution lanes 180 and 190. In other embodiments, processor 100 includes another number of execution lanes. In various embodiments, execution lane 180 is used to execute instructions of a particular type labeled "T1." In an embodiment, instructions of type T1 include integer instructions and memory access instructions. In some embodiments, execution lane 190 is used to execute instructions of a particular type labeled "T2." In an embodiment, instructions of type T2 include single instruction multiple data (SIMD), floating point, and/or multimedia instructions. Instructions of type T1 are not executed in execution lane 190, and instructions of type T2 are not executed in execution lane 180.

Instructions 110 are from any supported instruction set architecture (ISA). As shown, instructions 110 include instructions of the two types T1 and T2. For example, the general instructions A, D and F are instructions of type T1. Therefore, instructions A, D and F will be assigned to execution lane 180. In contrast, instructions B, C and E are instructions of type T2. Therefore, instructions B, C and E will be assigned to execution lane 190. Generally, processor 100 accesses a cache memory subsystem for data and instructions. In various embodiments, processor 100 contains its own level 1 (L1) cache, such as instruction cache 120, for accessing instructions and reducing memory latency. Another cache, such as a level 2 (L2) cache (not shown), is also used to reduce memory latency in other embodiments. Instructions 110 are loaded into instruction cache 120 for storage. In various embodiments, instructions are loaded into instruction cache 120 at a granularity of a cache line where cache lines have any one of supported sizes. In some embodiments, instruction cache 120 uses any one of various available types of associativity and tag access logic for storing and accessing data such as instructions.

In an embodiment, front-end pipeline 130 includes a fetch unit, which selects a thread to process and generates a fetch address to send to instruction cache 120. In some embodiments, the fetch address is generated from a value stored in a program counter associated with the selected thread or a predicted branch target address. In some embodiments, the front-end pipeline 130 includes an instruction translation lookaside buffer (ITLB) to support virtual to physical address translation, which maps a virtual page number to a particular physical page number, leaving the page offset unmodified. The translated fetch address is sent to the instruction cache 120.

In various embodiments, the front-end pipeline 130 includes decode logic for identifying the particular operation of a fetched instruction by analyzing its opcode. The decode logic also identifies the destination operand and the one or more source operands. In various embodiments, the operands are encoded as architectural register (logical registers) within the instruction. In some embodiments, the decode logic converts a complex instruction into two or more simpler instructions. In some embodiments, data dependencies are determined between instructions. In an embodiment, the decode logic also assigns the instruction to a particular one of the execution lanes 180-190 based on the opcode. In one embodiment, this assignment is used to select which one of queues 150 and 160 to allocate an entry for the instruction in a later pipeline stage.

In some embodiments, the front-end pipeline 130 includes a register rename unit for translating architectural register numbers (logical register numbers) to rename register numbers (physical register numbers). Register renaming is used to remove write-after-read and write-after-write dependencies between instructions. In some embodiments, the register rename unit uses one or more mapping tables to maintain the current mappings in processor 100. In various embodiments, after fetched instructions are decoded, data dependencies are determined and register names are renamed, the instructions are sent to instruction issue queue 140 for scheduling.

Instruction issue queue 140 receives instructions via interface 142 from the front-end pipeline 130 and selects one of the queues 150 and 160 for storage. As shown, queue 150 stores instructions of type T1 for execution lane 180, and queue 160 stores instructions of type T2 for execution lane 190. In some embodiments, the received instructions include metadata with an indication specifying which one of queues 150 and 160 is to store a particular instruction. In other embodiments, control logic 170 analyzes the received instructions and accompanying metadata, and determines which one of queues 150 and 160 is to store a particular instruction. In the illustrated embodiment, queue 150 includes an age field 152 for storing an age (in program order) for instructions. Similarly, queue 160 includes an age field 162 for storing an age (in program order) for instructions.

In an embodiment, ages are maintained as a count value with the oldest instruction having an age of zero, the next oldest instruction having a count of one, and so forth. Therefore, the youngest age currently allocated in entries of queues 150 and 160 has the largest count. As shown, instructions A-D of instructions 110 are allocated in entries of queues 150 and 160. Since instructions A and D are instructions of type T1, these instructions are stored in queue 150. Since instructions B and C are instructions of type T2, these instructions are stored in queue 160. Instruction A is the oldest instruction and has age '0.' Instruction B is the next oldest instruction and has age '1,' followed by instruction C with age '2,' and instruction D with age '3.' Here, instruction D is the current youngest instruction stored in queues 150 and 160, and instruction D has the largest age.

In various embodiments, control logic 170 schedules instructions allocated in queues 150 and 160 for issue via interfaces 144 and 146 to execution lanes 180 and 190. In an embodiment, control logic 170 determines a number of instructions to be issued from queues 150 and 160. To do this, control logic 170 determines which instructions stored in allocated entries of queues 150 and 160 are candidates for issue, which is followed by determining which candidates are actually selected for issue. In one embodiment, control logic 170 identifies a first group of instructions to be issued based at least upon source readiness, no existing data dependencies, and having available functional units for executing the instruction. Each instruction in the first group is to be executed by a respective one of execution lanes 180 and 190.

In an embodiment, control logic 170 begins with the oldest instruction in each of queues 150 and 160. Therefore, the initial candidates are instructions A and B. Further qualifications are used to determine how to schedule the candidate instructions. Further details are provided in the examples shown in FIG. 2. Additionally, an older vector 172 is updated indicating which instructions of the issued instructions are older than an issued instruction assigned to an execution lane capable of flushing its pipeline. In some embodiments, older vector 172 is used when a misprediction occurs or when an exception occurs. When a misprediction or an exception occurs, older vector 172 is used to determine which instructions continue executing and which instructions are removed and potentially restarted. In addition, older vector 172 is used to determine in which order instructions commit when they reach the commit stage at the same time.

In various embodiments, execution lanes 180 and 190 include one or more pipeline stages. In some embodiments, one of execution lanes 180 and 190 includes one or more extra staging pipeline stages in order to align the number of pipeline stages with the other one of execution lanes 180 and 190. Therefore, a commit pipeline stage is aligned between execution lanes 180 and 190. In an embodiment, a writeback pipeline stage occurs concurrent with or after the commit pipeline stage. In various embodiments, bypass forwarding of results occurs prior to the commit pipeline stage in each of execution lanes 180 and 190. The pipeline stages of one of the execution lanes 180 and 190 includes different functional units than the other one of the execution lanes 180 and 190, since execution lanes 180 and 190 are used to execute instructions of different types.

In various embodiments, each of execution lanes 180 and 190 performs in-order execution of instructions. Therefore, it is known instructions being executed in earlier pipeline stages are younger than instructions being executed in later pipeline stages. However, extra information is sent from instruction issue queue 140 to indicate which instructions are older within a same pipeline stage. Older vector 172 provides the extra information. Next, further details of the scheduling logic in the instruction issue queue 140 and the generation of this information is provided.

Figure 2:
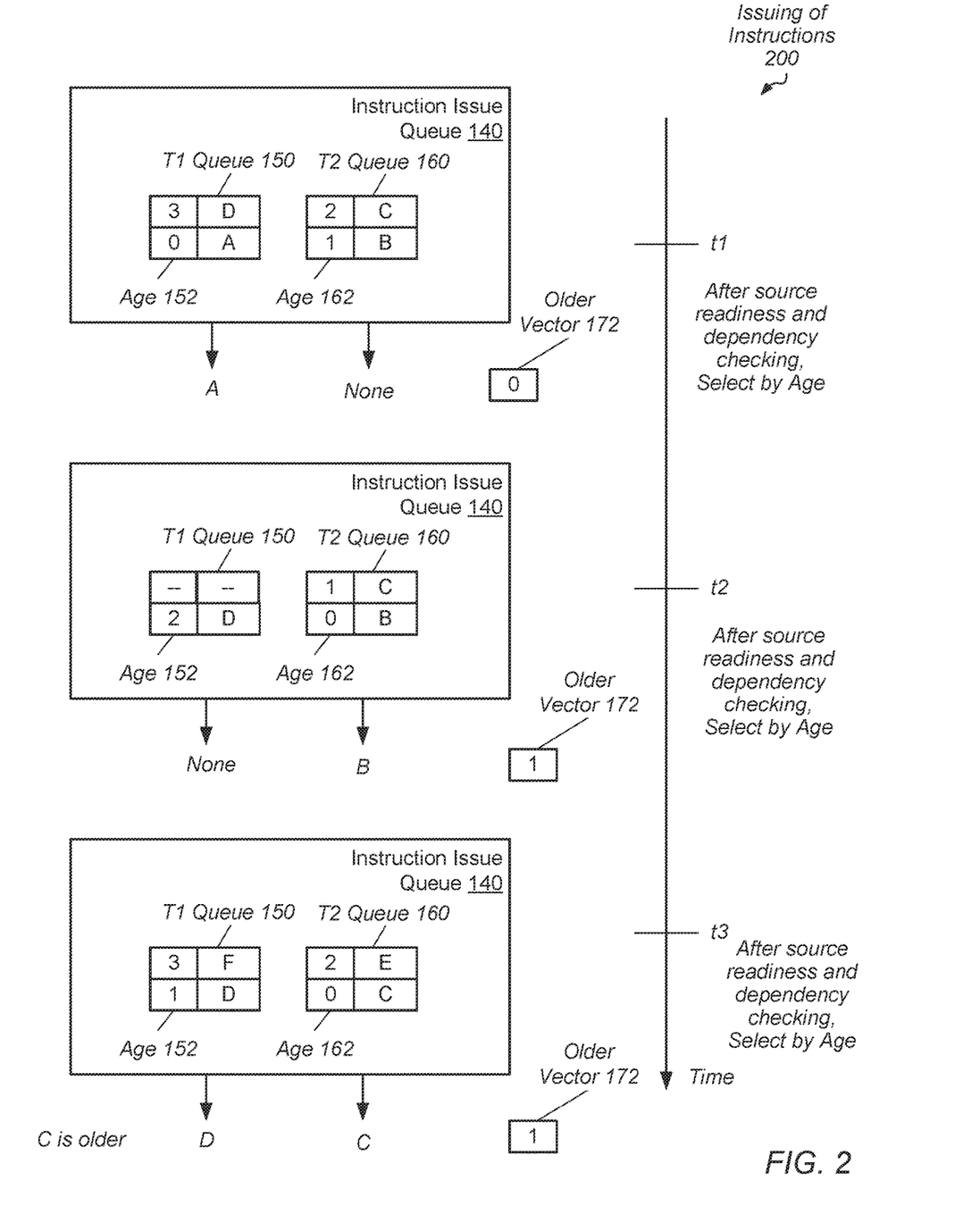
FIG. 2 is a block diagram of one embodiment of issuing of instructions.

Turning now to FIG. 2, a generalized block diagram of one embodiment of issuing of instructions 200 is shown. Circuits and logic previously described are numbered identically. In the illustrated embodiment, the instruction issue queue 140 is shown at three different points in time such as time t1, time t2 and time t3. Interfaces and control logic are not shown for ease of illustration. As described earlier, instruction issue queue 140 stores instructions A-D in queues 150 and 160. This is shown in FIG. 2 as occurring at time t1.

As described earlier, instructions A and B are candidate instructions for issue since they are the oldest instructions in each of queues 150 and 160. In an example, instruction B has a data dependency, whereas instruction A has no data dependency and a functional unit is available for executing instruction A. Therefore, instruction A is issued, but not instruction B. The older vector 172 is set to indicate that execution lane 180 has the older instruction of the issued instructions. In the illustrated embodiment, the binary value '0' is used to indicate execution lane 180 has the older instruction of the issued instructions, whereas, the binary value '1' is used to indicate execution lane 190 has the older instruction of the issued instructions.

At time t2, the ages stored in queues 150 and 160 have been updated. In an embodiment, the ages are updated based on the number of instructions issued. Since a single instruction, which was instruction A, was issued, the ages in queues 150 and 160 are decremented by one. Therefore instruction B has its age updated from 1 to 0, instruction C has its age updated from 2 to 1, and instruction D has its age updated from 3 to 2. In an embodiment, queue 150 has instruction D shifted down. In other embodiments, no shifting occurs.

Since instruction queue 140 is allocated in an in-order manner, and there are no available entries for instruction E of type T2 in T2 queue 160, there are no instructions allocated in instruction queue 140. The T1 queue 150 has an available entry, but instruction F of type T1 is younger in program order than instruction E. Therefore, no instruction is allocated with an age of 3. In fact, no new instruction is allocated in the instruction queue 140 at all at time t2. For example, each of instruction E and instruction F is not allocated in the instruction queue 140 at time t2.

In various embodiments, a starting age is determined based on the identified current youngest age and the determined number of instructions issued. At the previous time t1, the current youngest age is 3 and the number of instructions selected for issue is 1. Therefore, the starting age is (3−1)+1, which is 3. Accordingly, if an instruction was able to be allocated at time t2, that instruction would be allocated with the starting age of 3. At time t2, instructions B and D are candidate instructions for issue since they are the oldest instructions in each of queues 150 and 160. In an example, instructions B and D have source operands ready, no data dependency and a respective functional unit is available for executing instruction B and instruction D. However, both instructions B and D are not issued together.

The age difference between instructions B and D exceeds a threshold. For execution lanes 180 and 190, the threshold is one. The age difference between instructions B and D is two. Therefore, instruction B is issued, but not instruction D. The older vector 172 is set to indicate that execution lane 190 has the older instruction of the issued instructions. In the illustrated embodiment, the binary value '1' is used to indicate execution lane 190 has the older instruction of the issued instructions.

Although instruction D is younger than instruction B, instruction D is also younger than instruction C. Since execution lane 180 is capable of flushing its pipeline, it is possible that instruction D is an instruction capable of mispredicting or causing an exception. For example, if instruction D is a load (read) instruction, in some embodiments, instruction D is predicted in an early pipeline stage to hit in the data cache. Younger, dependent instructions are issued based on having the loaded value forwarded in a particular pipeline stage. In another example, if instruction D is a conditional branch instruction, in some embodiments, instruction D is predicted in an early pipeline stage to have a particular direction such as a taken direction. If instruction D is determined in a later pipeline stage to mispredict, such as a load instruction misses in the data cache or the determined branch direction does not match the prediction, then some instructions are removed from execution lanes 180 and 190.

As described earlier, in various embodiments, execution lanes 180 and 190 execute instructions in an in-order manner. Therefore, instructions being executed in pipeline stages earlier than the pipeline stage with the mispredicted instruction are removed from execution lanes 180 and 190. Within the same pipeline stage as the mispredicted instruction, the older vector 172 is used to determine whether instructions other than the mispredicted instruction are also removed.

If instructions with no data dependence between them are permitted to issue with an age difference exceeding the threshold, then instructions are incorrectly removed from execution lanes 180 and 190 when a misprediction occurs. For example, if instruction D issues with instruction B, and instruction C issues in a later pipeline stage, and later instruction D is determined to mispredict, then each instruction including instruction C being executed in an earlier pipeline stage is removed from execution lanes 180 and 190. However, instruction C is older than instruction D, and the continued execution of instruction C is required for correctness.

In some embodiments, the selected threshold determines the size of the older vector 172. If instructions are issued with an age difference exceeding the selected threshold, then the older vector 172 does not indicate relative ages among all instructions in the group being issued. Even without misprediction or an exception, it is unknown in what order to commit the instructions in the issued group when they reach the commit pipeline stage and the age difference exceeds the selected threshold. Accessing the older vector 172 does not determine the order to commit the instructions when the age difference exceeds the selected threshold. The potential incorrect commit of these instructions results in corruption of processor state. Therefore, for multiple reasons, instruction D is held back from being issued at time t2.

At time t3, the ages stored in queues 150 and 160 have been updated. In an embodiment, the ages are updated based on the number of instructions issued. Since a single instruction, which was instruction B, was issued, the ages in queues 150 and 160 are decremented by one. Therefore instruction C has its age updated from 1 to 0, and instruction D has its age updated from 2 to 1. In an embodiment, queue 150 has instruction C shifted down. In other embodiments, no shifting occurs. Queue 160 has instruction E allocated in an available entry. Again, in various embodiments, the starting age is determined based on the identified current youngest age and the determined number of instructions issued. In this example, queue 160 has an available entry allocated for an instruction (instruction E) older than instruction F. Therefore, instruction E is allocated in queue 160 with an age of 2, whereas, instruction F is allocated in queue 150 with an age of 3.

At the previous time t2, the current youngest age is 2 and the number of instructions selected for issue is 1. Therefore, the starting age is (2−1)+1, which is 2. Accordingly, instruction E is allocated with the starting age of 2. In addition, instruction F is permitted to be sent to the instruction queue 140. Instruction F is allocated in queue 150 with an age of 3. At time t3, instructions C and D are candidate instructions for issue since they are the oldest instructions in each of queues 150 and 160. In an example, instructions C and D have source operands ready, no data dependency and a respective functional unit is available for executing instruction C and instruction D. In addition, the age difference between instructions C and D is one, which does not exceed the threshold of one. Therefore, instructions C and D issue together at time t3. The older vector 172 is set to indicate that execution lane 190 has the older instruction of the issued instructions. In the illustrated embodiment, the binary value '1' is used to indicate execution lane 190 has the older instruction of the issued instructions.

Although not shown, afterward, such as at a time t4, the ages stored in queues 150 and 160 are updated. In an embodiment, the ages are updated based on the number of instructions issued. Since two instructions, which were instructions C and D, were issued, the ages in queues 150 and 160 are decremented by two. Therefore, the next oldest instruction, which is the instruction E, has its age updated from 2 to 0, and instruction F has its age updated from 3 to 1. In an embodiment, queue 150 has instruction F shifted down and queue 160 has instruction E shifted down. In other embodiments, no shifting occurs. The starting age for a next instruction to be allocated in one of queues 150 and 160 is (3−2)+1, or the starting age is 2.

Figure 3:
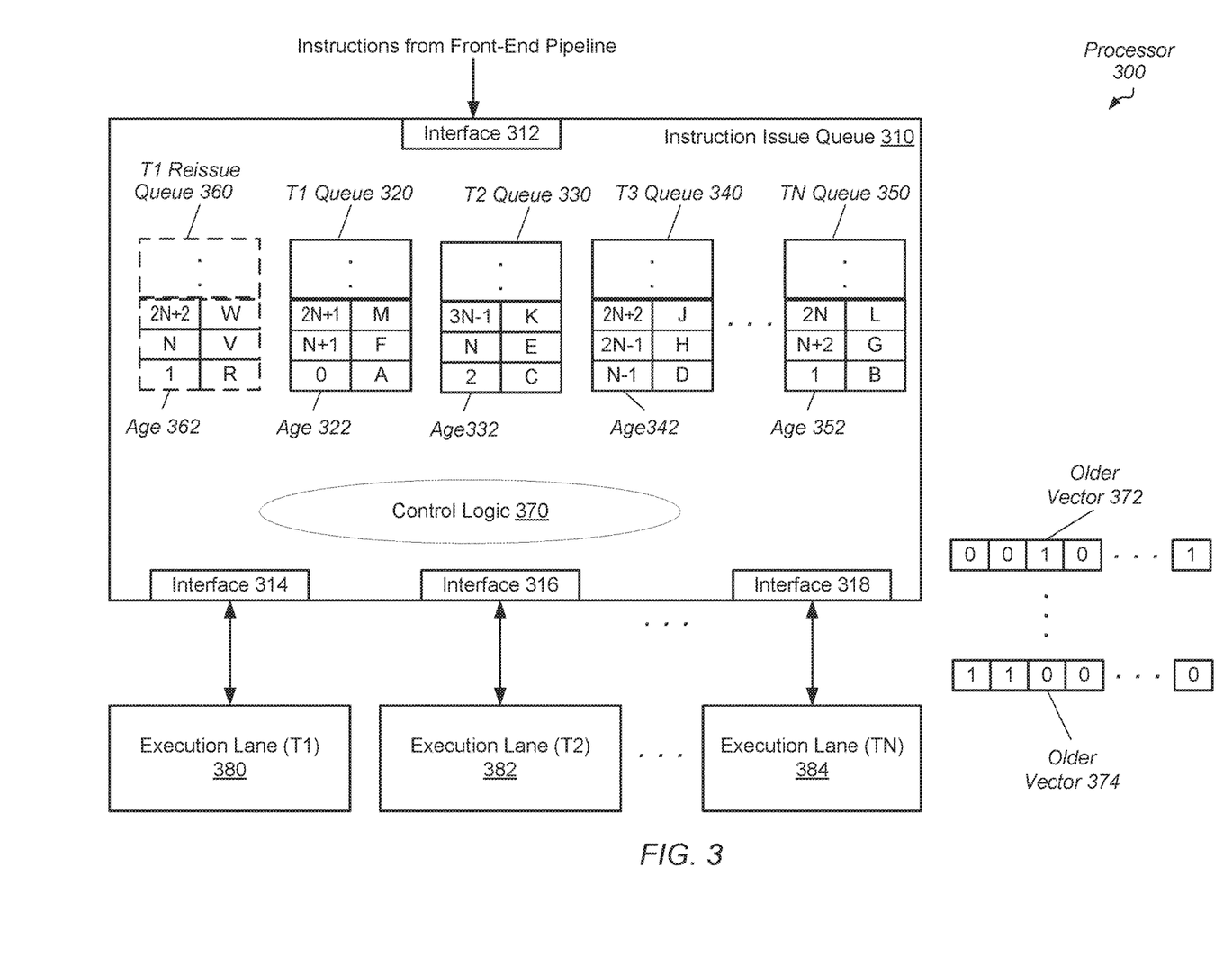
FIG. 3 is a block diagram of one embodiment of a processor.

Referring to FIG. 3, a generalized block diagram of one embodiment of a processor 300 is shown. In the illustrated embodiment, instruction and data caches as well as the front-end pipeline are not shown for ease of illustration. An instruction issue queue 310 and an integer number N execution lanes 380-384 are shown. In various embodiments, execution lane 380 is used to execute instructions of a particular type labeled "T1." One or more of execution lanes 382-384 are incapable of executing instructions of type T1. Execution lane 382 executes instructions of type T2. One or more of execution lanes 380-384 other than 382 are incapable of executing instructions of type T2. Execution lane 384 executes instructions of type TN. One or more of execution lanes 380-382 are incapable of executing instructions of type TN.

In various embodiments, execution lanes 380-384 are used in a similar manner as described earlier for execution lanes 180 and 190 (of FIG. 1). For example, one or more of execution lanes 380-384 include one or more extra staging pipeline stages in order to align the number of pipeline stages with the other one of execution lanes 380-384. Therefore, a commit pipeline stage is aligned between execution lanes 380-384. In an embodiment, a writeback pipeline stage occurs concurrent with or after the commit pipeline stage. In various embodiments, each of execution lanes 380-384 performs in-order execution of instructions. Therefore, it is known instructions being executed in earlier pipeline stages are younger than instructions being executed in later pipeline stages. However, extra information is sent from instruction issue queue 310 to indicate which instructions are older within a same pipeline stage. Older vectors 372-374 provides the extra information.

As shown, instruction issue queue 140 receives instructions via interface 312 from the front-end pipeline and selects one of the queues 320-350 for storage. As shown, queue 320 stores instructions of type T1 for execution lane 380, queue 330 stores instructions of type T2 for execution lane 382, queue 340 stores instructions of type T3 for an execution lane not shown, and queue 350 stores instructions of type TN for execution lane 384. In some embodiments, the received instructions include metadata with an indication specifying which one of queues 320-350 is to store a particular instruction. In other embodiments, control logic 370 analyzes the received instructions and accompanying metadata, and determines which one of queues 320-350 is to store a particular instruction.

In the illustrated embodiment, queue 320 includes an age field 322 for storing an age (in program order) for instructions. Similarly, queues 330-350 includes an age fields 332-352 for storing an age (in program order) for instructions. As shown, instruction issue queue 310 also includes reissue queue 360 for storing instructions of type T1. Queue 360 also has an age field 362 for storing an age (in program order) for instructions. Although not shown for ease of illustration, in various embodiments, instruction issue queue 310 also includes reissue queues for instructions of type T2 to type TN. When instructions are removed from execution lanes 380-384 due to an exception or a misprediction, such as a load instruction misses in the data cache, the removed instructions are stored in one or more of the reissue queues based on the type of the removed instructions. Therefore, the removed instructions are restarted within the instruction issue queue 310, rather than re-fetched from the instruction cache. In some embodiments, the instructions in the reissue queues have priority over the instructions stored in queues 320-350 after instructions are removed from pipelines.

In various embodiments, control logic 370 schedules instructions allocated in queues 320-350 (and reissue queues, if available) for issue via interfaces 314-318 to execution lanes 380-384. In some embodiments, control logic 370 uses a scheduling algorithm described earlier for control logic 170, but scaled to include execution lanes 0 to N where N is a positive non-zero integer. Additionally, older vectors 372-374 are updated indicating which instructions of the issued instructions are older than an issued instruction assigned to an execution lane capable of flushing its pipeline. For example, if execution lane 380 is capable of flushing its pipeline, then older vector 372 is updated to indicate which ones of execution lanes 382-384 have an instruction both older than the instruction issued to execution lane 380 and issued at the same time. Older vector 372 is used when a misprediction occurs in execution lane 380 and for determining which instructions to continue executing and which instructions to remove and potentially restart.

In a similar manner as described above, if execution lane 384 is capable of flushing its pipeline, then older vector 374 is updated to indicate which ones of execution lanes other than execution lane 384 have an instruction both older than the instruction issued to execution lane 384 and issued at the same time. Older vector 374 is used when a misprediction occurs in execution lane 384 and for determining which instructions to continue executing and which instructions to remove and potentially restart. In some embodiments, older vectors 372-374 are combined into a single vector and an offset is used to determine which bit field corresponds to which execution lane.

Figure 4:
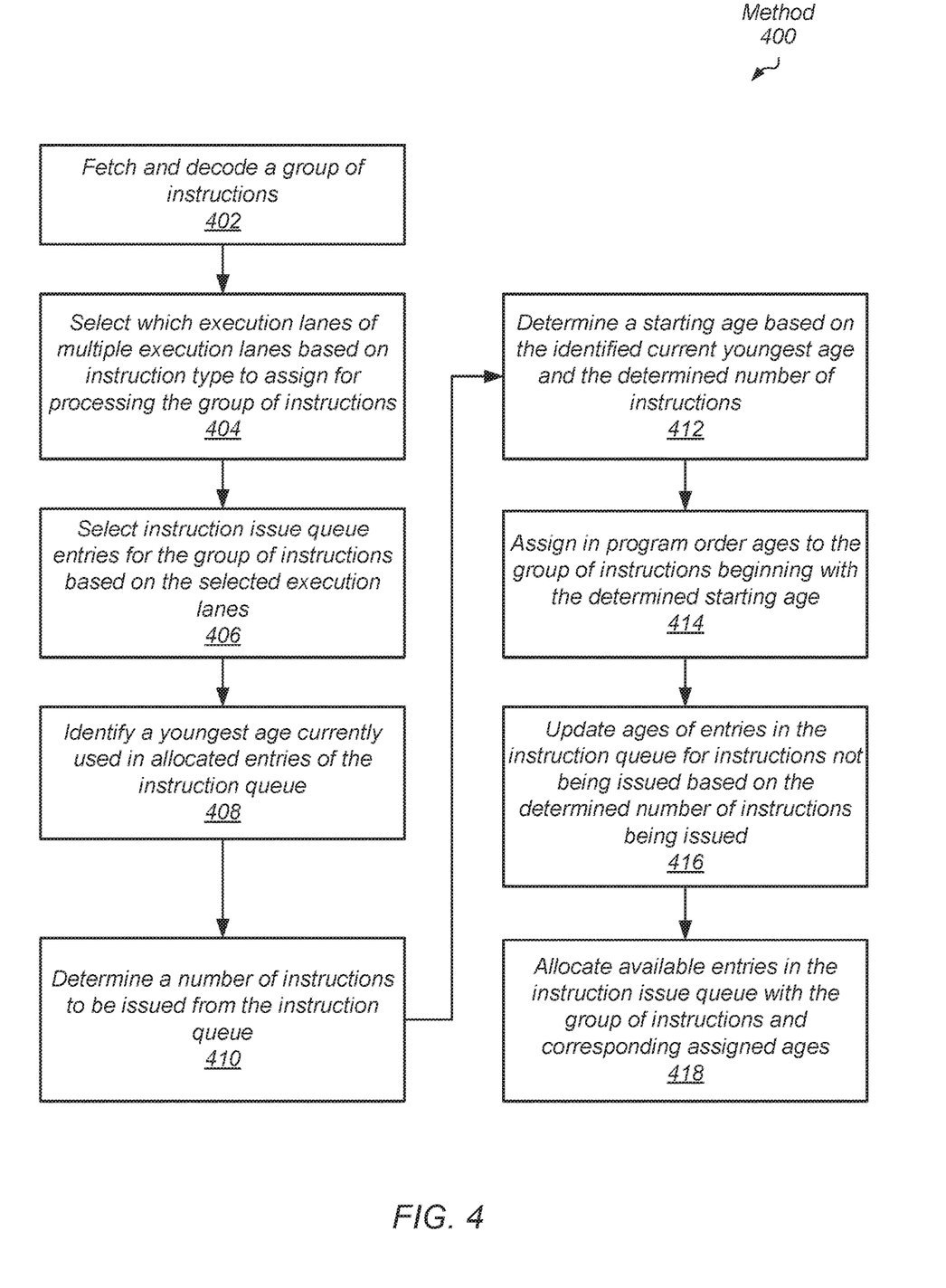
FIG. 4 is a flow diagram of one embodiment of a method for efficiently handling instruction execution ordering.

Referring now to FIG. 4, a generalized flow diagram of one embodiment of a method 400 for efficiently handling instruction execution ordering is shown. For purposes of discussion, the steps in this embodiment (as well as for FIGS. 5-6) are shown in sequential order. However, in other embodiments some steps may occur in a different order than shown, some steps may be performed concurrently, some steps may be combined with other steps, and some steps may be absent.

A group of instructions are fetched and decoded (block 402). Instructions are fetched from an instruction cache by a fetch unit of a processor. Subsequent pipeline stages of the processor perform opcode decoding, dependency checking, and register renaming. In various embodiments, a processor includes multiple execution lanes. In some embodiments, each execution lane executes instructions of a particular type, which are not executed by one or more of the other execution lanes. In an example, one execution lane executes integer instructions and memory access instructions, whereas another execution lane executes single instruction multiple data (SIMD) instructions, floating point instructions, and/or multimedia instructions. Based on instruction type, execution lanes of the multiple execution lanes are selected for processing the group of instructions (block 404).

Instruction issue queue entries are selected for the group of instructions based on the selected execution lanes (block 406). In some embodiments, the instruction issue queue includes one queue for each particular execution lane. Control logic in the instruction issue queue identifies a youngest age currently used in allocated entries of the instruction issue queue (block 408). In an embodiment, ages are maintained as a count value with the oldest instruction having an age of zero, the next oldest instruction having a count of one, and so forth. Therefore, the youngest age currently used in allocated entries has the largest count.

A number of instructions to be issued from the instruction queue is determined (block 410). Selection logic determines which instructions stored in allocated entries of the instruction issue queue are candidates for issue, and which candidates are actually selected for issue. Further details are provided in the upcoming description of the steps of method 500 (of FIG. 5). A starting age is determined based on the identified current youngest age and the determined number of instructions (block 412). In an embodiment, ages are maintained as a count value with the oldest instruction having an age of zero, the next oldest instruction having a count of one, and so forth. Therefore, the youngest age currently used in allocated entries has the largest count. In one example, when the youngest age is 5 and the number of instructions to be issued is 3, then the starting age is (5−3)+1, or 3.

In program order ages are assigned to the group of instructions beginning with the determined starting age (block 414). Ages of entries in the instruction queue for instructions not being issued are updated based on the determined number of instructions being issued (block 416). In one example, the ages are decremented by the number of instructions being issued. Available entries in the instruction issue queue are allocated with the group of instructions and corresponding assigned ages (block 418).

Figure 5:
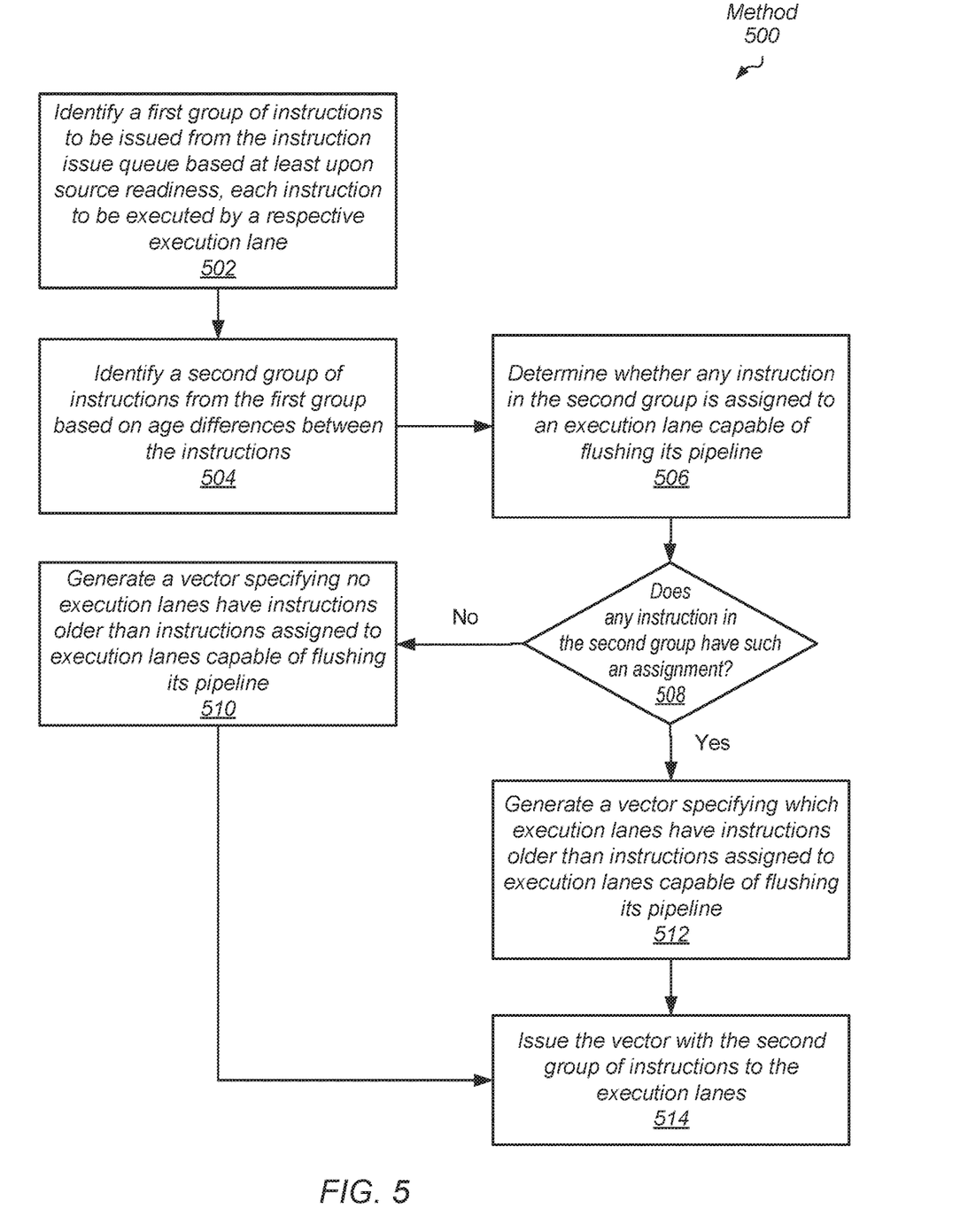
FIG. 5 is a flow diagram of one embodiment of a method for efficiently handling instruction execution ordering.

Referring now to FIG. 5, a generalized flow diagram of one embodiment of a method 500 for efficiently handling instruction execution ordering is shown. A first group of instructions to be issued from the instruction issue queue are identified based at least upon source readiness, each instruction to be executed by a respective execution lane (block 502). In some embodiments, one or more other factors are also used such as no data dependencies and having available functional units for executing the instruction.

A second group of instructions are identified from the first group based on determining age differences between the instructions (block 504). In various embodiments, each instruction in the second group has an age difference below a threshold with each other instruction in the second group. In some embodiments, the oldest instruction in the first group is also in the second group. Therefore, in these embodiments, determining the age difference begins with the oldest instruction in the first group. Accordingly, instructions are not issued with older instructions where the age difference between the instructions are not below the threshold. In some embodiments, a vector, such as an age vector or an older vector, is used to indicate the relative ages between instructions in the second group. The selected threshold determines the size of the vector. If a first instruction is issued ahead of an older second instruction with an age difference not below the threshold, and accordingly, the vector does not indicate relative ages among all instructions in the second group being issued, then it is unknown which instructions should be removed from the execution lanes at a later time if a misprediction occurs. If it is unknown, then all instructions are removed from the execution lanes, which are not in a pipeline stage ahead of the mispredicted instruction. Accordingly, some instructions are incorrectly removed and potentially restarted, which can cause processor state corruption. In addition, if the age vector does not indicate relative ages among all instructions in the second group being issued, then without misprediction, it is unknown in what order to commit the instructions. Incorrect commit results in corruption of processor state.

It is determined whether any instruction in the second group is assigned to an execution lane capable of flushing its pipeline (block 506). For example, one or more memory access instructions and control flow instructions have results predicted early in the pipeline stages before the results are known in later pipeline stages. In one example, a load (read) instruction is predicted to hit in the data cache. Younger, dependent instructions are issued based on having the loaded value forwarded in a particular pipeline stage. In another example, a conditional branch instruction is predicted to have a particular direction such as a taken direction.

If no instruction in the second group has an assignment to an execution lane capable of flushing its pipeline ("no" branch of the conditional block 508), then a vector is generated specifying no execution lanes have instructions older than instructions assigned to execution lanes capable of flushing its pipeline (block 510). For that particular pipeline stage, there are no instructions in the second group older than instructions capable of flushing a pipeline. However, if any instruction in the second group has an assignment to an execution lane capable of flushing its pipeline ("yes" branch of the conditional block 508), then a vector is generated specifying which execution lanes have instructions older than instructions assigned to execution lanes capable of flushing its pipeline (block 514). For that particular pipeline stage, there are one or more instructions in the second group older than instructions assigned to execution lanes capable of flushing its pipeline.

The generated vector identifies which instructions in this particular pipeline stage are older than instructions being assigned to execution lanes capable of flushing its pipeline. Therefore, if misprediction or an exception occurs later, such as a miss occurs to the data cache, then the instructions in other execution lanes and in the same pipeline stage as the mispredicted instruction (e.g., load instruction), which are older than the mispredicted instruction, are not removed from the execution lanes and restarted. Rather, these older instructions identified by the generated vector continue execution.

In an embodiment, the vector for a given execution lane includes a bit for each other execution lane and the bit position in the vector identifies a particular other execution lane. In one embodiment, an asserted binary value indicates the particular other execution lane has an older instruction. In an embodiment, the asserted value is a binary "1." In other embodiments, the asserted value is a binary "0." In some embodiments, there are multiple execution lanes capable of flushing its pipeline. Therefore, multiple vectors are generated, one for each execution lane capable of flushing its pipeline. Rather than generate a matrix, in an embodiment, the multiple vectors are combined into a single vector where a known offset is used to distinguish which vector corresponds to which execution lane.

After vector generation, the vector is issued with the second group of instructions to the execution lanes (block 514). As the second group of instructions proceeds through the pipeline stages of the assigned execution lanes, the vector also traverses with the second group down the pipeline stages. Should a misprediction occur, the vector is accessed to determine which instructions in the same pipeline stage as the mispredicted instruction continue and which instructions are removed and restarted.

Figure 6:
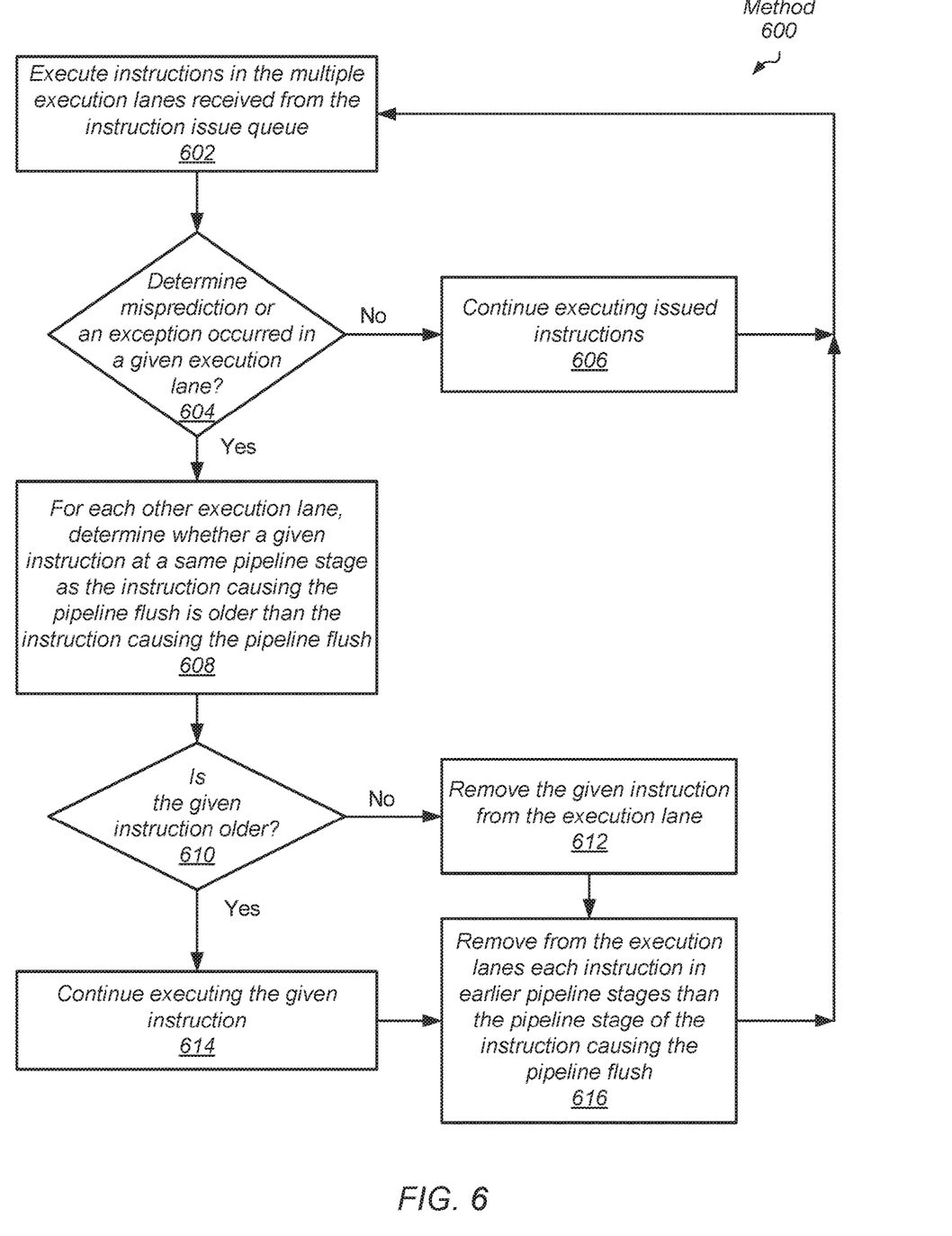
FIG. 6 is a flow diagram of one embodiment of a method for efficiently handling instruction execution ordering.

Referring now to FIG. 6, a generalized flow diagram of one embodiment of a method 600 for efficiently handling instruction execution ordering is shown. Instructions are executed in the multiple execution lanes received from the instruction issue queue (block 602). If it is not determined that a misprediction occurred in a given execution lane ("no" branch of the conditional block 604), then the issued instructions continue executing (block 606). If it is determined that a misprediction occurred in a given execution lane ("yes" branch of the conditional block 604), then for each other execution lane, it is determined whether a given instruction at a same pipeline stage as the mispredicted instruction is older than the mispredicted instruction (block 608).

If the given instruction is younger than the mispredicted instruction in the same pipeline stage ("no" branch of the conditional block 610), then the given instruction is removed from the execution lane (block 612). If the given instruction is older than the mispredicted instruction in the same pipeline stage ("yes" branch of the conditional block 610), then the given instruction continues execution in its assigned execution lane (block 614). Each instruction in earlier pipeline stages than the pipeline stage of the mispredicted instruction are removed from the execution lanes (block 616).

Figure 7:
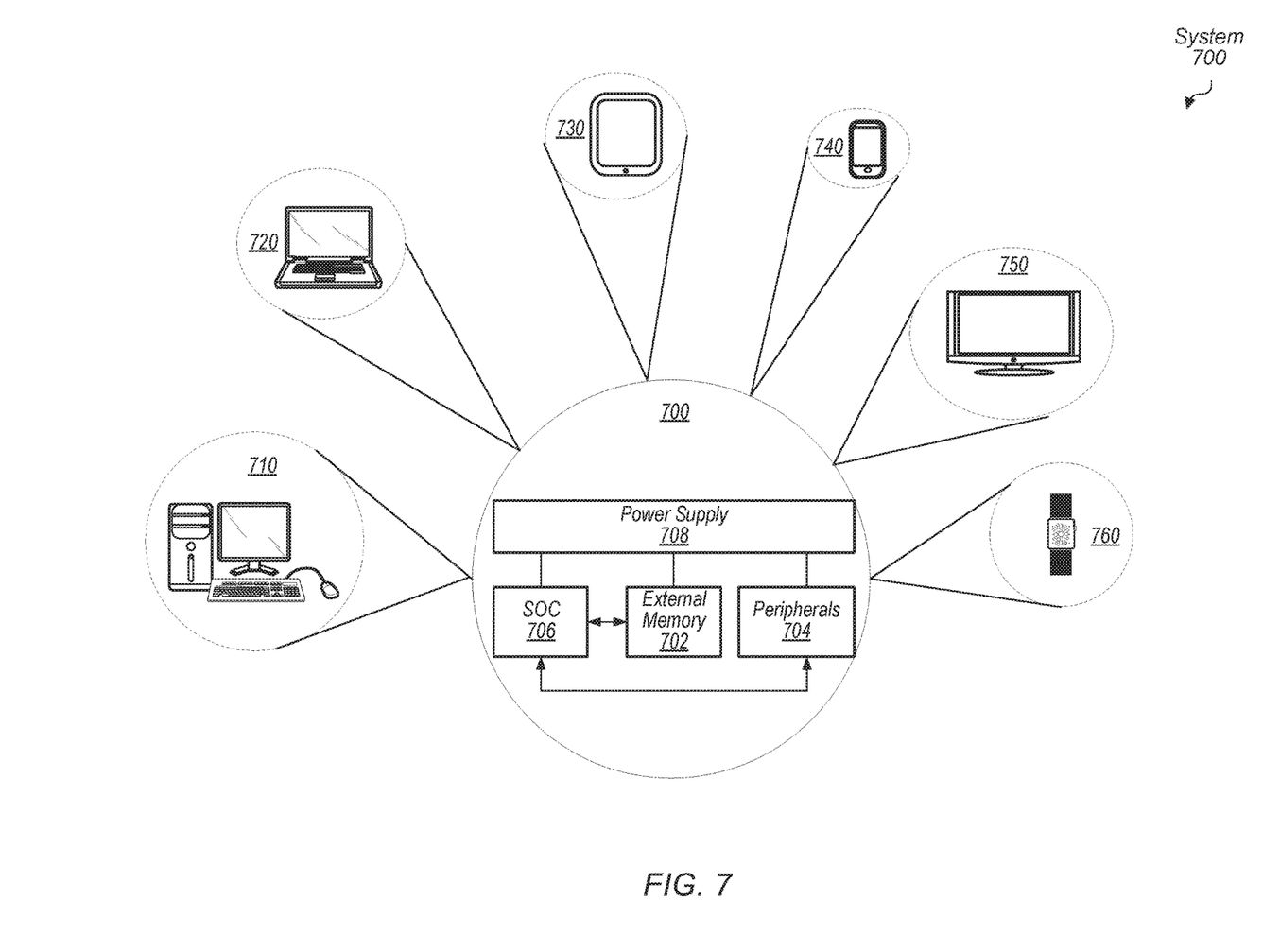
FIG. 7 is a block diagram of one embodiment of a system.

Turning next to FIG. 7, a block diagram of one embodiment of a system 700 is shown. As shown, system 700 represents chip, circuitry, components, etc., of a desktop computer 710, laptop computer 720, tablet computer 730, cell or mobile phone 740, television 750 (or set top box coupled to a television), wrist watch or other wearable item 760, or otherwise. Other devices are possible and are contemplated. In the illustrated embodiment, the system 700 includes at least one instance of a system on chip (SoC) 706 which includes multiple types of processing units, such as a central processing unit (CPU), a graphics processing unit (GPU), or other, a communication fabric, and interfaces to memories and input/output devices. In some embodiments, one or more processors in SoC 706 includes multiple execution lanes and an instruction issue queue similar to processor 100 (of FIG. 1) and processor 300 (of FIG. 3). In various embodiments, SoC 706 is coupled to external memory 702, peripherals 704, and power supply 708.

A power supply 708 is also provided which supplies the supply voltages to SoC 706 as well as one or more supply voltages to the memory 702 and/or the peripherals 704. In various embodiments, power supply 708 represents a battery (e.g., a rechargeable battery in a smart phone, laptop or tablet computer). In some embodiments, more than one instance of SoC 706 is included (and more than one external memory 702 is included as well).

The memory 702 is any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAIVIBUS DRAM (RDRAM), static RAM (SRAM), etc. One or more memory devices are coupled onto a circuit board to form memory modules such as single inline memory modules (SIMMs), dual inline memory modules (DIMMs), etc. Alternatively, the devices are mounted with a SoC or an integrated circuit in a chip-on-chip configuration, a package-on-package configuration, or a multi-chip module configuration.

The peripherals 704 include any desired circuitry, depending on the type of system 700. For example, in one embodiment, peripherals 704 includes devices for various types of wireless communication, such as Wi-Fi, Bluetooth, cellular, global positioning system, etc. In some embodiments, the peripherals 704 also include additional storage, including RAM storage, solid state storage, or disk storage. The peripherals 704 include user interface devices such as a display screen, including touch display screens or multi-touch display screens, keyboard or other input devices, microphones, speakers, etc.

In various embodiments, program instructions of a software application may be used to implement the methods and/or mechanisms previously described. The program instructions may describe the behavior of hardware in a high-level programming language, such as C. Alternatively, a hardware design language (HDL) may be used, such as Verilog. The program instructions may be stored on a non-transitory computer readable storage medium. Numerous types of storage media are available. The storage medium may be accessible by a computer during use to provide the program instructions and accompanying data to the computer for program execution. In some embodiments, a synthesis tool reads the program instructions in order to produce a netlist including a list of gates from a synthesis library.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. An apparatus comprising:
   a plurality of queues configured to store instructions to be executed by a plurality of execution lanes; and
   circuitry configured to:
      identify a first group of instructions comprising a plurality of instructions stored in two or more queues of the plurality of queues that are to be issued to the plurality of execution lanes based at least in part on a determination that the first group of instructions are ready to issue;
      determine relative ages of instructions in the first group of instructions to at least two other instructions stored in at least two queues based on an associated count;
      identify a second group of instructions of the first group of instructions that have an age difference with one another below a threshold; and
      issue the second group of instructions to the plurality of execution lanes, wherein at least two instructions of the second group of instructions are issued to different lanes of the plurality of execution lanes.

2. The apparatus as recited in claim 1, wherein based at least in part on a determination that one or more instructions of the second group of instructions are assigned to an execution lane capable of flushing its pipeline, the circuitry is further configured to:
   generate a vector specifying which lanes of the plurality of execution lanes have assigned instructions of the second group older than an instruction of the second group assigned to the execution lane capable of flushing its pipeline; and
   issue the vector with the second group of instructions to the plurality of execution lanes.

3. The apparatus as recited in claim 1, wherein based at least in part on a determination that a misprediction occurs in a given execution lane of the plurality of execution lanes, the circuitry is further configured to:
   determine, for each execution lane other than the given execution lane, whether a given instruction at a same pipeline stage as a mispredicted instruction is older than the mispredicted instruction;
   continue execution of the given instruction responsive to determining the given instruction is older than the mispredicted instruction; and
   remove the given instruction from the given execution lane responsive to determining the given instruction is younger than the mispredicted instruction.

4. The apparatus as recited in claim 1, wherein the circuitry is further configured to set the threshold as a number of the plurality of execution lanes less one.

5. The apparatus as recited in claim 1, wherein the circuitry is further configured to:
   identify a current youngest age used in allocated entries of the plurality of queues;
   determine a number of instructions in the second group to be issued from the plurality of queues; and
   determine a starting age based on the identified current youngest age and the determined number of instructions in the second group to be issued.

6. The apparatus as recited in claim 5, wherein the circuitry is further configured to:
   assign in program order ages to a third group of instructions being allocated in the plurality of queues beginning with the determined starting age; and
   allocate the third group of instructions with the assigned ages in the plurality of queues.

7. The apparatus as recited in claim 5, wherein the circuitry is further configured to update ages of entries in the plurality of queues for instructions not being issued based on the determined number of instructions in the second group to be issued.

8. A method, comprising:
   storing, in a plurality of queues by circuitry of an instruction issue queue, instructions to be executed by a plurality of execution lanes;
   identifying, by the circuitry, a first group of instructions comprising a plurality of instructions stored in two or more queues of the plurality of queues that are to be issued to the plurality of execution lanes based at least in part on a determination that the first group of instructions are ready to issue;
   determining, by the circuitry, relative ages of instructions in the first group of instructions to at least two other instructions stored in at least two queues based on an associated count;
   identifying, by the circuitry, a second group of instructions of the first group of instructions that have an age difference with one another below a threshold; and
   issuing, by the circuitry, the second group of instructions to the plurality of execution lanes, wherein at least two instructions of the second group of instructions are issued to different lanes of the plurality of execution lanes.

9. The method as recited in claim 8, wherein in response to determining one or more instructions of the second group of instructions are assigned to an execution lane capable of flushing its pipeline, the method further comprises:
   generating a vector specifying which lanes of the plurality of execution lanes have assigned instructions of the second group older than an instruction of the second group assigned to the execution lane capable of flushing its pipeline; and
   issuing the vector with the second group of instructions to the plurality of execution lanes.

10. The method as recited in claim 9, wherein in response to determining a misprediction occurs in a given execution lane of the plurality of execution lanes, the method further comprises:
    determining, for each execution lane other than the given execution lane, whether a given instruction at a same pipeline stage as a mispredicted instruction is older than the mispredicted instruction;
    continuing execution of the given instruction responsive to determining the given instruction is older than the mispredicted instruction; and
    removing the given instruction from the given execution lane responsive to determining the given instruction is younger than the mispredicted instruction.

11. The method as recited in claim 10, wherein determining whether the given instruction is older than the mispredicted instruction comprises accessing the vector issued with the mispredicted instruction and the given instruction.

12. The method as recited in claim 8, further comprising:
    determining a number of instructions in the second group to be issued from the plurality of queues; and
    updating ages of entries in the plurality of queues for instructions not being issued based on the determined number of instructions in the second group to be issued.

13. The method as recited in claim 8, further comprising setting the threshold as a number of the plurality of execution lanes less one.

14. The method as recited in claim 8, further comprising:
    identifying a current youngest age used in allocated entries of the plurality of queues;
    determining a number of instructions in the second group to be issued from the plurality of queues; and
    determining a starting age based on the identified current youngest age and the determined number of instructions in the second group to be issued.

15. The method as recited in claim 14, wherein the method further comprises:
    assigning in program order ages to a third group of instructions being allocated in the plurality of queues beginning with the determined starting age; and
    allocating the third group of instructions with the assigned ages in the plurality of queues.

16. A processor comprising:
    an instruction cache;
    a plurality of execution lanes;
    an instruction issue queue comprising a plurality of queues configured to store instructions to be executed by the plurality of execution lanes; and
    wherein the instruction issue queue is configured to:
      store instructions retrieved from the instruction cache;
      identify a first group of instructions comprising a plurality of instructions stored in two or more queues of the plurality of queues that are to be issued to the plurality of execution lanes based at least in part on a determination that the first group of instructions are ready to issue;
      determine relative ages of instructions in the first group of instructions to at least two other instructions stored in at least two queues based on an associated count;
      identify a second group of instructions of the first group of instructions that have an age difference with one another below a threshold; and
      issue the second group of instructions to the plurality of execution lanes, wherein at least two instructions of the second group of instructions are issued to different lanes of the plurality of execution lanes.

17. The processor as recited in claim 16, wherein based at least in part on a determination that one or more instructions of the second group of instructions are assigned to an execution lane capable of flushing its pipeline, the instruction issue queue is further configured to:
    generate a vector specifying which lanes of the plurality of execution lanes have assigned instructions of the second group older than an instruction of the second group assigned to the execution lane capable of flushing its pipeline; and issue the vector with the second group of instructions to the plurality of execution lanes.

18. The processor as recited in claim 16, wherein based at least in part on a determination that a misprediction occurs in a given execution lane of the plurality of execution lanes, the processor is further configured to:

determine, for each execution lane other than the given execution lane, whether a given instruction at a same pipeline stage as a mispredicted instruction is older than the mispredicted instruction;

continue execution of the given instruction responsive to determining the given instruction is older than the mispredicted instruction; and remove the given instruction from the given execution lane responsive to determining the given instruction is younger than the mispredicted instruction.

19. The processor as recited in claim 16, wherein the instruction issue queue is further configured to set the threshold as a number of the plurality of execution lanes less one.

20. The processor as recited in claim 16, wherein the instruction issue queue is further configured to:

identify a current youngest age used in allocated entries of a plurality of queues;

determine a number of instructions in the second group to be issued from the plurality of queues; and determine a starting age based on the identified current youngest age and the determined number of instructions in the second group to be issued.

\* \* \* \* \*